(12) United States Patent
Cogne et al.

(10) Patent No.: US 9,056,529 B2
(45) Date of Patent: Jun. 16, 2015

(54) CARCASS REINFORCEMENT FOR AN AIRPLANE TIRE

(75) Inventors: Michael Cogne, Riom (FR); Jean-Luc Dendievel, Coumon D'Auvergne (FR)

(73) Assignees: COMPAGNIE GENERALE DES ETABLISSEMENTS MICHELIN, Clermont-Ferrand (FR); Michelin Recherche et Technoque S.A., Granges-Paccot (CH)

( * ) Notice: Subject to any disclaimer, the term of this patent is extended or adjusted under 35 U.S.C. 154(b) by 299 days.

(21) Appl. No.: 13/516,998

(22) PCT Filed: Dec. 7, 2010

(86) PCT No.: PCT/EP2010/069081
§ 371 (c)(1),
(2), (4) Date: Aug. 28, 2012

(87) PCT Pub. No.: WO2011/073059
PCT Pub. Date: Jun. 23, 2011

(65) Prior Publication Data
US 2012/0305160 A1  Dec. 6, 2012

(30) Foreign Application Priority Data

Dec. 16, 2009 (FR) ...................................... 09 59046

(51) Int. Cl.
*B60C 15/024* (2006.01)
*B60C 15/06* (2006.01)
*B60C 15/02* (2006.01)
*B60C 15/00* (2006.01)

(52) U.S. Cl.
CPC ......... *B60C 15/02* (2013.01); *Y10T 152/10828* (2015.01); *B60C 15/0018* (2013.04); *B60C 15/06* (2013.01); *B60C 2200/02* (2013.04)

(58) Field of Classification Search
CPC .... B60C 15/00; B60C 15/02; B60C 15/0018; B60C 15/06; B60C 2015/024; B60C 2015/04; B60C 2015/06
See application file for complete search history.

(56) References Cited

U.S. PATENT DOCUMENTS 6,427,741 B1    8/2002  Lukich et al.

FOREIGN PATENT DOCUMENTS

| EP | 0 407 214   |   | 1/1991  |
|----|-------------|---|---------|
| EP | 1288024     | * | 3/2003  |
| EP | 1 381 525   |   | 2/2006  |
| FR | 1 349 247   |   | 1/1964  |
| FR | 2 809 053   |   | 11/2001 |
| JP | 2000-127718 |   | 5/2000  |
| JP | 2004-523430 |   | 8/2004  |
| JP | 2010-120476 |   | 6/2010  |

* cited by examiner

*Primary Examiner* — Justin Fischer
(74) *Attorney, Agent, or Firm* — Cozen O'Connor

(57) ABSTRACT

A technique for comprising the compression fatigue rupture strength of the carcass reinforcement external layer (3) of an aeroplane tire in the region of bending on the rim (7). The distance (d) between a point (A) on the bead external face (6) and the carcass reinforcement external layer (3), measured along the straight line perpendicular at this point to the bead external face, is at a maximum at the point (M) on the bead external face that is the orthogonal projection of the radially external end (E) of the filling element (5) onto the bead external face, and the distance ($d_{max}$) between the orthogonal projection (M) of the radially external end (E) of the filling element (5) onto the bead external face (6) and the carcass reinforcement external layer (3) is at least equal to 1.3 times the distance ($d_1$) between the orthogonal projection (L) of the center (O) of the bead wire core (4) onto the bead external face and the carcass reinforcement external layer.

10 Claims, 2 Drawing Sheets

CARCASS REINFORCEMENT FOR AN AIRPLANE TIRE

RELATED APPLICATIONS

This is a U.S. National Phase Application under 35 USC 371 of International Application PCT/EP2010/069081 filed on Dec. 7, 2010.

This application claims the priority of French application Ser. No. 09/59046 filed Dec. 16, 2009, the entire content of which is hereby incorporated by reference.

The present invention relates to an aeroplane tire the use of which is characterized by high pressure, load and speed conditions and, in particular, to an aeroplane tire the nominal pressure of which is higher than 9 bar and the nominal deflection of which is greater than 30%.

BACKGROUND OF THE INVENTION

The nominal pressure is the nominal pressure to which the tire is inflated and as defined, for example, by the Tire and Rim Association or TRA, standard.

The nominal deflection of a tire is, by definition, its radial deformation, or variation in radial height, as it changes from an unladened inflated state to a statically loaded inflated state under the nominal pressure and load conditions defined, for example, in the TRA standard. It is expressed in the form of a relative deflection, defined as the ratio of this variation in radial height of the tire to half the difference between the outside diameter of the tire and the maximum diameter of the rim measured on the rim flange. The outside diameter of the tire is measured under static conditions in an unladened state inflated to the nominal pressure. The TRA standard in particular defines the flattening of an aeroplane tire in terms of its flattened radius, which means the distance between the axis of the wheel of the tire and the plane of the ground with which the tire is in contact under nominal pressure and load conditions.

The following definitions hold true in what follows:
"Meridian plane": a plane containing the axis of rotation of the tire.
"Equatorial plane": the plane passing through the middle of the tread surface of the tire and perpendicular to the axis of rotation of the tire.
"Radial direction": a direction perpendicular to the axis of rotation of the tire.
"Axial direction": a direction parallel to the axis of rotation of the tire.
"Circumferential direction": a direction perpendicular to a meridian plane and tangential to the tread surface of the tire.
"Radial distance": a distance measured perpendicular to the axis of rotation of the tire and from the axis of rotation of the tire.
"Axial distance": a distance measured parallel to the axis of rotation of the tire and from the equatorial plane.
"Radially": in a radial direction.
"Axially": in an axial direction.
"Radially on the inside of/radially on the outside of": the radial distance of which is less/greater than.
"Axially on the inside/axially on the outside of": which is at a lesser/greater axial distance.

A tire comprises a tread connected, by two sidewalls, to two beads intended to come in contact with a rim comprising two rim flanges. Each rim flange comprises a rim flange circular portion which is radially outermost, connected radially on the inside to a rim flange flat face the normal to which is directed substantially axially.

A radial tire more particularly comprises a reinforcement, comprising a crown reinforcement, radially on the inside of the tread, and a radial carcass reinforcement, radially on the inside of the crown reinforcement.

The radial carcass reinforcement of an aeroplane tire comprises a plurality of carcass reinforcement layers of which the axially outermost one in the bead is the carcass reinforcement external layer.

Each carcass reinforcement layer, made up of mutually parallel reinforcing elements which make an angle of between 80° and 100° with the circumferential direction, is wrapped, in each bead, around a bead wire core comprising a circumferential reinforcing element usually made of metal surrounded by at least one material which, non-exhaustively, may be polymer or textile. The meridian section of the bead wire core, which means the cross section through the bead wire core on a meridian plane, is inscribed inside a circle the centre of which is known as the centre of the bead wire core.

The carcass reinforcement layers, as described for example in document EP 1 381 525, usually comprise at least one layer known as the internal layer, which is wrapped around the bead wire core from the inside of the tire outwards to form a turned-back portion terminating in an end, and at least one layer known as the external layer, wrapped around the bead wire core from the outside of the tire inwards and axially on the outside, within the sidewall, of all the internal layers and of their respective turned-back portions.

The reinforcing elements of the carcass reinforcement layers, for aeroplane tires, are usually cords made of spun textile filaments, preferably made of aliphatic polyamides and/or of aromatic polyamides.

The tensile mechanical properties of the textile reinforcing elements (modulus, elongation and force at break) are measured after prior conditioning. What is meant by "prior conditioning" is that the textile reinforcing elements are stored for at least 24 hours, before measurement, in a standard atmosphere in accordance with European standard DIN EN 20139 (at a temperature of 20±2° C.; hygrometry of 65±2%). The measurements are taken in the known way using a tensile testing machine by ZWICK GmbH & Co (Germany) of type 1435 or type 1445. The textile reinforcing elements experience tension over an initial length of 400 mm at a nominal rate of 200 mm/min. All of the results are averaged over 10 measurements.

Each bead comprises a filling element which extends the bead wire core radially outwards. The filling element in any meridian plane has a substantially triangular meridian section exhibiting a radially external end and is made up of at least one filling polymer material. The filling element may consist of a stack in the radial direction of at least two filling polymer materials in contact with one another along a contact surface which intersects any meridian plane along a meridian line. The filling element in particular separates the internal layer which is axially closest to the bead wire from the turned-back portions and the layers axially on the outside of the said internal layer.

After curing, a polymer material is mechanically characterized by tensile stress-strain characteristics that are determined by tensile testing. These tensile tests are carried out, on a test specimen, in accordance with a method known to those skilled in the art, for example in accordance with international standard ISO 37, and under normal temperature (23+ or −2° C.) and hygrometry (50+ or −5% relative humidity) conditions defined by international standard ISO 471. The tensile stress of a polymer compound, measured for a 10% elongation of the test specimen and expressed in megapascals (MPa) is called the 10% elongation elastic modulus.

In use, the mechanical stresses of running induce bending cycles in the beads of the tire which wrap over the rim flanges.

Each bead, under the combined action of the nominal pressure and of the load applied to the tire which can vary between 0 and twice the nominal load, thus to adopts the geometry of the rim flange via its face axially on the outside of the bead wire core, known as the bead external face, which thus comes into contact with the rim flange.

The region of bending over the rim is the part of the bead the external face of which is intended to come into at least partial contact with the rim flange circular portion when the load applied to the tire inflated to its nominal pressure varies from 0 to twice the nominal load.

The bending cycles generate, in the carcass reinforcement layer portions situated in the region of bending over the rim, variations in curvature which are combined with variations in elongation. These variations in elongation or strain, particularly in the axially outermost carcass reinforcement layers, may have negative minimum values corresponding to their being placed in compression, and this may lead to fatigue rupture of the carcass reinforcement layer reinforcing elements and therefore degradation of the tire. The carcass reinforcement layers are then said to rupture through compression fatigue because of compressive strain which is too high in terms of absolute value, compressive strain being, by convention, negative.

The risk of a carcass reinforcement layer rupturing through compressive fatigue is higher the more axially external the carcass reinforcement layer is, which means the further away it is from the neutral axis of the bead considered like a beam in bending. Therefore, minimizing the risk of compressive fatigue rupture of the axially outermost carcass reinforcement layer or carcass reinforcement external layer makes it possible to minimize the risk of compressive fatigue rupture of the carcass reinforcement layers which are axially on the inside of the carcass reinforcement external layer and axially on the outside of the neutral axis of the bead.

The person skilled in the art also knows that the carcass reinforcement layers made up of reinforcing elements particularly comprising aromatic polyamides have low compression strength and are particularly susceptible to compressive fatigue rupture.

SUMMARY OF THE INVENTION

One object of the invention is to improve the compressive fatigue rupture strength of the carcass reinforcement external layer of an aeroplane tire in the region of bending on the rim.

According to one aspect of the invention, this objective has been reached using an aeroplane tire, the nominal pressure of which is higher than 9 bar and the nominal deflection of which is greater than 30%, comprising:

a tread connected, by two sidewalls, to two beads intended to come into contact with a rim comprising two rim flanges, a radial carcass reinforcement comprising a plurality of carcass reinforcement layers, the axially outermost of which is the carcass reinforcement external layer, each carcass reinforcement layer consisting of reinforcing elements which, within each bead, are wrapped around one and the same bead wire core the meridian section of which is inscribed inside a circle of centre the centre of the bead wire core a filling element radially on the outside of the bead wire core and having a substantially triangular meridian section exhibiting a radially external end, each bead having an external face axially on the outside of the bead wire core and intended to come into contact with the rim flange, the distance between a point on the bead external face and the carcass reinforcement external layer, measured along the straight line perpendicular at this point to the bead external face, being at a maximum at the point on the bead external face that is the orthogonal projection of the radially external end of the filling element onto the bead external face, and the distance between the orthogonal projection of the radially external end of the filling element onto the bead external face and the carcass reinforcement external layer being at least equal to 1.3 times the distance between the orthogonal projection of the centre of the bead wire core onto the bead external face and the carcass reinforcement external layer.

The bead external face is all of the points of the bead that are intended to come into contact with the rim flange, which means to say with the rim flange planar face the normal to which is directed substantially axially, or with the rim flange circular portion. The radially internal end of the bead external face is the point on the bead external face intended to be the point of contact with the radially innermost point of the rim flange planar face. The radially external end of the bead external face is the point of the bead external face intended to be the last point of contact with the rim flange circular portion when a load equal to twice the nominal load is applied to the tire inflated to its nominal pressure.

The distance from a point on the bead external face to the carcass reinforcement external layer is measured, along the straight line perpendicular at this point to the bead external face, between this point and the point of intersection of said straight line with the axially external generatrix of a reinforcing element of the carcass reinforcement external layer.

The theoretical radially external end of the filling element is the radially outermost point of the filling element, radially on the outside of which the carcass reinforcement layers and/or the carcass reinforcement turned-back portions meet and are adjacent in twos. Within the meaning of the invention, the radially external end of the filling element means the point, in the vicinity of the theoretical radially external end, of which the orthogonal projection onto the bead external face defines the maximum distance between the bead external face and the carcass reinforcement external layer. In the vicinity of means a distance between the radially external end and the theoretical radially external end that is at most equal to 10 mm. In other words, taking manufacturing tolerances into consideration, the maximum distance between the bead external face and the carcass reinforcement external layer is obtained at a point on the filling element, known as the radially external end of the filling element and positioned radially on the inside of the theoretical radially external end, at a distance from said theoretical radially external end that is between zero and 10 mm.

A maximum distance between the bead external face and the carcass reinforcement external layer, at the orthogonal projection of the radially external end of the filling element onto the bead external face gives the meridian curve of the carcass reinforcement external layer of a tire according to the invention, inflated to the nominal pressure and subjected to a load that can vary from 0 to twice the nominal load, radii of curvature that are greater than those of the reference tire, for the points of the carcass reinforcement external layer that lie in the region of bending on the rim.

The increase in the radii of curvature at those points on the carcass reinforcement external layer that lie in the region of bending on the rim leads to a reduction, in absolute terms, in the compressive strain that by convention is negative at these points, hence improving the rupture strength in terms of compression fatigue rupture of the reinforcing elements of the carcass reinforcement external layer and therefore lengthening the life of the tire.

The inventors have also been able to demonstrate that the orthogonal projection of the radially external end of the filling element onto the bead external face lies in the vicinity of the point on the bead external face that is intended to be the last point of contact with the rim flange when the nominal load is applied to the tire inflated to its nominal pressure.

Advantageously, the distance between the orthogonal projection of the radially external end of the filling element onto the bead external face and the carcass reinforcement external layer is at least equal to 1.3 times the distance between the orthogonal projection of the centre of the bead wire core onto the bead external face and the carcass reinforcement external layer. This minimum value contributes towards increasing the radii of curvature in the region of bending on the rim, by comparison with the reference tire, and therefore to reducing the compressive strain applied to the carcass reinforcement external layer.

It is also advantageous for the distance between the orthogonal projection of the radially external end of the filling element onto the bead external face and the carcass reinforcement external layer to be at most equal to 3 times the distance between the orthogonal projection of the centre of the bead wire core onto the bead external face and the carcass reinforcement external layer. This maximum value makes it possible to limit the thickness of polymer material known as the filler polymer material axially on the outside of the carcass reinforcement external layer and axially on the inside of the sidewall, and therefore limit the dissipation of heat in the region of bending on the rim, thus avoiding thermal degradation of the bead.

The distance between the orthogonal projection of the centre of the bead wire core onto the bead external face and the carcass reinforcement external layer is advantageously at least equal to 0.5 times the diameter of the circle circumscribing the bead wire core. This minimum value contributes towards increasing the radii of curvature in the region of bending on the rim, by comparison with the reference tire, and therefore to reducing the compressive strain applied to the carcass reinforcement external layer.

The distance between the orthogonal projection of the centre of the bead wire core onto the bead external face and the carcass reinforcement external layer is at most equal to the diameter of the circle circumscribing the bead wire core. This maximum value makes it possible to limit the dissipation of heat in the region of binding on the rim, comprised between the bead wire core and the bead external face in contact with the rim flange planar face, thus avoiding thermal degradation of the bead. In addition, this maximum value guarantees a level of binding of the bead on the rim flange planar face that is necessary for holding the bead on the rim when the tire is running.

It is also advantageous to have the distance between the point of the bead external face that is intended to be the last point of contact with the rim flange circular portion when a load equal to 2 times the nominal load is applied to the tire inflated to its nominal pressure, and the carcass reinforcement external layer at least equal to 0.7 times the distance between the orthogonal projection of the centre of the bead wire core onto the bead external face and the carcass reinforcement external layer. This minimum value makes it possible to increase the radii of curvature at the points on the carcass reinforcement external layer which lie in the region of bending on the rim, for a tire according to the invention, inflated to the nominal pressure and subjected to a load that can vary from 0 to 2 times the nominal load.

The distance between the point of the bead external face that is intended to be the last point of contact with the rim flange circular portion when a load equal to 2 times the nominal load is applied to the tire inflated to its nominal pressure, and the carcass reinforcement external layer is, again advantageously, at most equal to 1.5 times the distance between the orthogonal projection of the centre of the bead wire core onto the bead external face and the carcass reinforcement external layer. This maximum value makes it possible to limit the thickness of polymer material, axially on the outside of the carcass reinforcement external layer, and therefore limit the dissipation of heat and therefore avoid thermal degradation of the bead.

The radial distance, which means the distance to the axis of rotation of the tire, of the orthogonal projection of the radially external end of the filling element onto the bead external face is at most equal to the radial distance of the point of the bead external face intended to be the last point of contact with the rim flange circular portion when the nominal load is applied to the tire inflated to its nominal pressure. Therefore, between the two straight lines perpendicular to the bead external face at these two respective points, the carcass reinforcement layers are coupled in twos, which means to say that the distance between their respective neutral axes is at most equal to twice the cross-sectional diameter of a reinforcing element that forms part of the carcass reinforcement layers. This, when the tire is inflated, causes the carcass reinforcement external layer to be placed under tension, the preloading effect of which limits the ability of the carcass reinforcement external layer to be subject to compression when the bead flexes under the load applied to the tire inflated to its nominal pressure.

It is further more advantageous for the radial distance of the orthogonal projection of the radially external end of the filling element onto the bead external face to be at least equal to 0.97 times the radial distance of the point of the bead external face intended to be the last point of contact with the rim flange circular portion when the nominal load is applied to the tire inflated to its nominal pressure. This minimum value guarantees a minimal radial distance of the radially external end of the filling element below which the filling element is unable to allow the bead to wrap progressively over the rim flange.

For preference, according to the invention, the reinforcing elements of the carcass reinforcement layers are made of textile materials.

For preference also, the reinforcing elements of the carcass reinforcement layers are of the aromatic polyamide, aliphatic polyamide, or hybrid type, which means one combining aliphatic polyamides and aromatic polyamides. Reinforcing elements of the hybrid type are described for example in patent EP 1 381 525.

The inventors are also proposing a mounted assembly comprising a tire, as described earlier, and a wheel comprising a rim on which the tire is mounted.

It is advantageous for the tire of the mounted assembly, according to a first embodiment of the invention, to be characterized by a distance between a point on the bead external face and the carcass reinforcement external layer, measured along the straight line perpendicular at this point to the bead external face, that is at a maximum at the point on the bead external face that is the orthogonal projection of the radially external end of the filling element onto the bead external face.

It is also advantageous for the tire of the mounted assembly, according to a second embodiment of the invention, to be characterized by a radial distance of the point on the bead external face that is furthest from the carcass reinforcement external layer of between 0.97 and 1 times the radial distance of the point of the bead external face that is intended to be the last point of contact with the rim flange circular portion when the nominal load is applied to the tire inflated to its nominal pressure. A point on the bead external face that is furthest from the carcass reinforcement external face means the point on the bead external face of which the distance to the carcass reinforcement external layer, measured along the straight line perpendicular at this point to the bead external face, is at its maximum.

BRIEF DESCRIPTION OF THE DRAWINGS

The features and other advantages of the invention will be better understood with the aid of attached FIGS. 1 and 2:

FIGS. 1 and 2 are not drawn to scale.

DETAILED DESCRIPTION OF THE DRAWINGS

Figure 1:
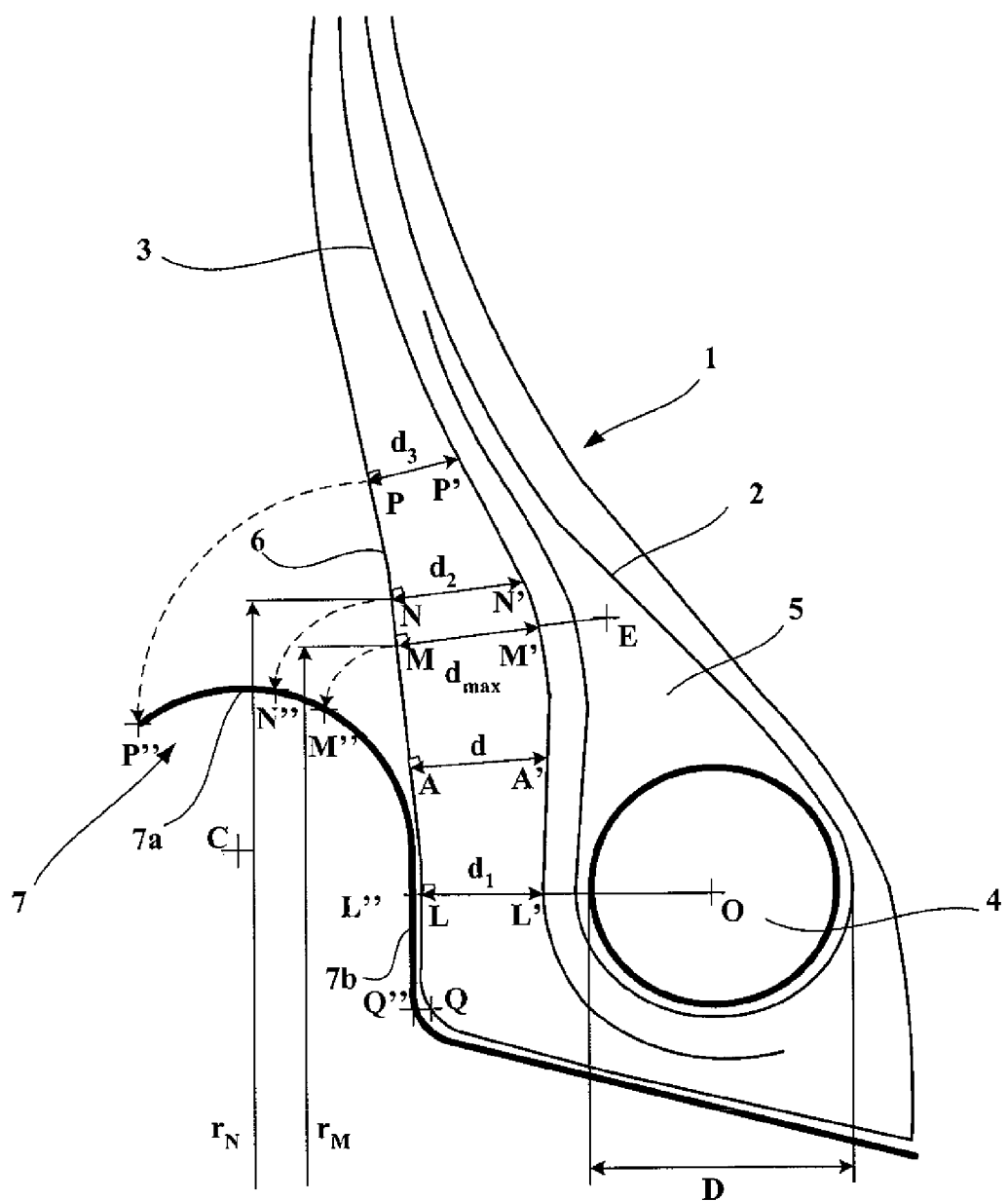
FIG. 1 is a meridian section through a tire bead according to an embodiment of the invention.

FIG. 1 shows a meridian section through a tire bead 1 according to the invention, mounted on a mounting rim comprising a rim flange 7 the radially external part of which is a rim flange circular portion 7a the centre of the circle of which is the point C, connected to a rim flange planar face 7b the normal to which is directed substantially axially. In FIG. 1, the tire is inflated to its nominal pressure and unladened.

The radial carcass reinforcement usually comprises a plurality of carcass reinforcement layers not all of which have been depicted in FIG. 1. FIG. 1 depicts just one carcass reinforcement internal layer 2, wrapped around the bead wire core 4 from the inside of the tire outwards to form a turned-back portion terminating in an end, and just one carcass reinforcement external layer 3, wrapped around the bead wire core 4 from the outside of the tire inwards and which is axially the outermost.

The bead wire core 4 is inscribed inside a circle of diameter D and of centre O, of which the orthogonal projection onto the bead external face 6 is the point L. The straight line passing through the points O and L and orthogonal to the bead external face 6 respectively intersects the carcass reinforcement external layer 3 at L' and the rim flange planar face 7b at L'', which is the point of contact with the rim flange planar face 7b. The distance $d_1$ is the distance between the orthogonal projection L of the centre O of the bead wire core 4 onto the bead external face 6 and the point L' of the carcass reinforcement external layer 3.

Radially on the outside of the bead wire core 4, the filling element 5 has a substantially triangular meridian section exhibiting a radially external end E of which the orthogonal projection onto the bead external face 6 is the point M. The straight line passing through the points E and M and orthogonal to the bead external face 6 at M intersects the carcass reinforcement external layer 3 at M'. The distance $d_{max}$ is the distance between the orthogonal projection M of the radially external end E of the filling element 5 onto the bead external face 6 and the point M' of the carcass reinforcement external layer 3.

The point M of the bead external face 6, on the tire inflated to its nominal pressure and unladened, is intended to be the point of contact M'' with the rim flange circular portion 7a when the tire, inflated to its nominal pressure, is loaded heavily enough to allow this contact.

According to the invention, the distance $d_{max}$ is the maximum value of the distance d of any arbitrary point A on the bead external face 6 and the carcass reinforcement external layer 3, the distance d being measured along the straight line perpendicular at A to the bead external face 6 between the point A and the point A', which is the intersection of the said straight line and of the carcass reinforcement external layer 3.

The bead external face 6 is the collection of points of the bead 1 which are intended to come into contact with the rim flange 7, which means to say with the rim flange planar face 7b the normal of which is directed substantially axially, or with the rim flange circular portion 7a.

The radially internal end Q of the bead external face 6 is the point of the bead external face 6 that is intended to be the radially innermost point Q'' in contact with the rim flange planar face 7b.

The radially external end P of the bead external face 6 is the point of the bead external face 6 that is intended to be the last point of contact P'' with the rim flange circular portion 7a when a load equal to 2 times the nominal load is applied to the tire inflated to its nominal pressure. The last point of contact P'' usually corresponds to the axially external end of the rim flange circular portion 7a. The distance $d_3$ is the distance between the points P and P'.

The point N of the bead external face 6 on the tire inflated to its nominal pressure but unladen, is the point on the bead external face 6 that is intended to be the last point of contact N'' with the rim flange circular portion 7a when the nominal load is applied to the tire inflated to its nominal pressure. The straight line perpendicular to the bead external face 6 at the point N intersects the carcass reinforcement layer 3 at N'. The distance $d_2$ is the distance between the points N and N'.

In FIG. 1, the points M and N have respective radial distances $r_M$ and $r_N$ which are the distances with respect to the axis of rotation of the tire which has not been depicted.

The invention has been aimed more particularly at an aeroplane tire with a radial carcass reinforcement of size 46×17.0R20, used on a fleet aeroplane, and of which the nominal pressure is 15.9 bar, the nominal load 20642 daN and the maximum speed 378 km/h.

In the example considered, the meridian section of the carcass reinforcement external layer of the tire according to the invention is characterized by radial distances $d_1$, $d_2$, $d_3$ and $d_{max}$ equal respectively to 13 mm, 15 mm, 10 mm and 17 mm. The diameter D of the circle circumscribing the bead wire core is 21 mm.

Figure 2:
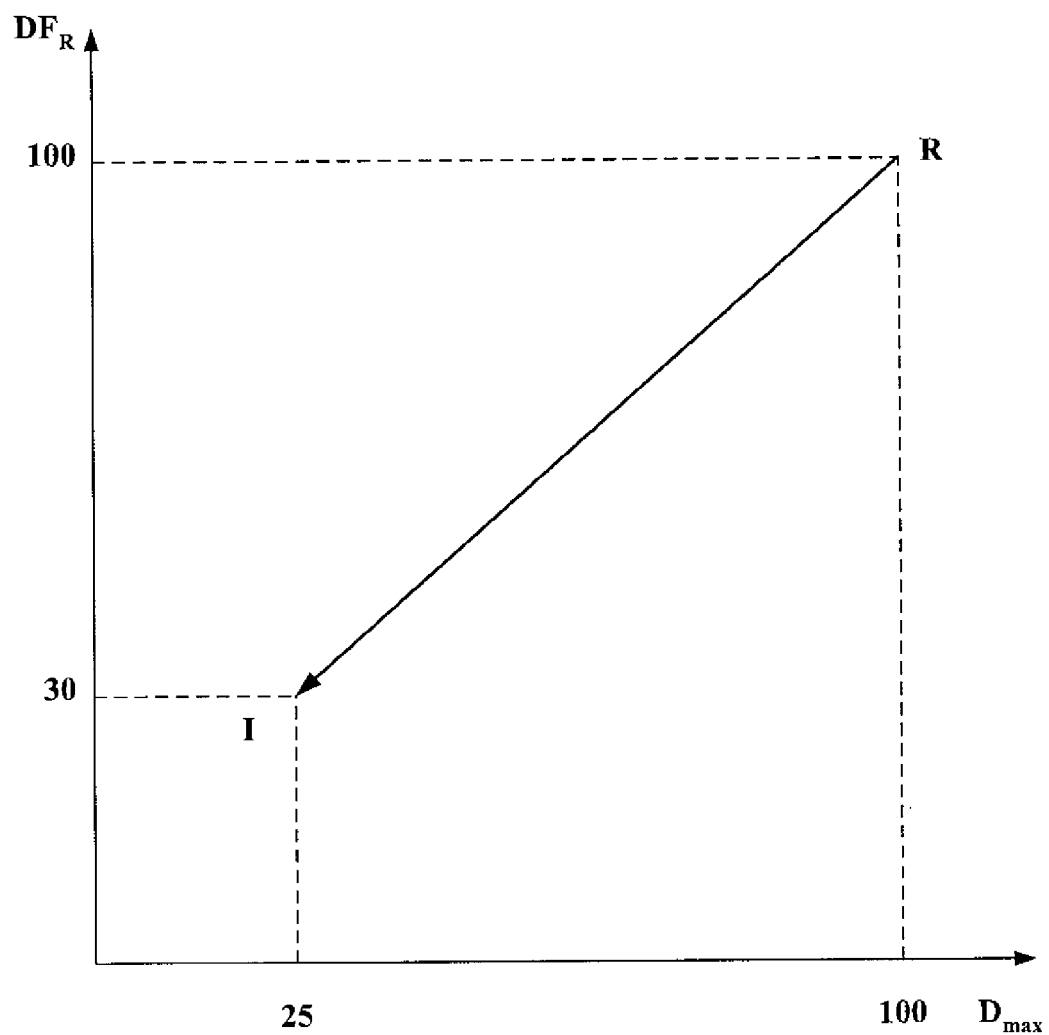
FIG. 2 is a diagram showing the advantage in terms of downfall, of the rupture strength of the reinforcing elements that make up the carcass reinforcement external layer in the region of bending on the rim for a tire according to an embodiment of the invention as compared with the reference tire.

FIG. 2 is a diagram depicting the difference in rupture force of the reinforcing elements of the carcass reinforcement external layer in the region of bending on the rim, between a tire that has undergone cycles of use during taxiing and a new tire, as a function of the compressive strain, at a maximum in terms of absolute value, of the carcass reinforcement external layer.

FIG. 2 shows the difference in rupture force of the reinforcing elements of the carcass reinforcement external layer for a tire according to the invention I and for a reference tire R of the prior art as disclosed, for example, in document EP 1 381 525.

The abscissa axis of the diagram in FIG. 2 shows the compressive strain $D_{max}$ of the carcass reinforcement external layer, at a maximum in terms of absolute value, in the region of bending on the rim in the vicinity of the point M'. This maximum compressive strain or deformation $D_{max}$ is the result of finite element numerical simulations performed on models of 46×17.0R20 tires inflated to the to nominal pressure of 15.9 bar and loaded to the nominal load of 20642 daN, in the case of the reference tire R and in the case of the tire according to the invention I. When the maximum compressive strain $D_{max}$ for the reference tire R is equal to 100, the maximum compressive strain $D_{max}$ for the tire according to the invention I is equal to 25, which shows that, in the example considered, the invention advantageously quarters the compression of the carcass reinforcement external layer.

The ordinate axis of the diagram of FIG. 2 gives the difference in rupture force $DF_R$ of the reinforcing elements of the carcass reinforcement external layer in the region of bending on the rim, between a tire that has undergone cycles of use during taxiing and a new tire. The difference in rupture force $DF_R$ of the reinforcing elements of the carcass reinforcement external layer is the difference between the rupture force measured on reinforcing elements taken from the carcass reinforcement external layer of a new tire and the rupture force measured on reinforcing elements taken from the carcass reinforcement external layer of a tire that has undergone an endurance test that reproduces cycles of use of the tire during taxiing, which means with the tire running along the ground. The measurements taken for a tire of a size 46×17.0R20 shows that, for a drop off in rupture force of 100 on a reference tire R the drop off in rupture force changes to 30 for the tire I according to the invention. In other words, in the example considered, the difference in rupture force $DF_R$ of the reinforcing elements of the carcass reinforcement external layer advantageously passes from 100 to 30 i.e. reduces by 70 when changing from the reference tire R to the tire according to the invention I, corresponding to the reduction in maximum compressive strain of the carcass reinforcement external layer.

The invention must not be interpreted as being restricted to the example illustrated in FIG. 1 but can be extended to cover other alternative forms of embodiment:

the number of carcass reinforcement layers can vary, by way of example from 2 to 10 carcass reinforcement layers, the number of carcass reinforcement internal layers, that form a turned-back portion of carcass reinforcement, can also vary, by way of example 1 to 7 carcass reinforcement internal layers, the turned-back ends may be situated at shorter radial distances than in the example considered, the end of the filling element may also be situated at a smaller radial distance than in the example considered.

The invention claimed is:

1. An aeroplane tire configured to maintain nominal pressure of higher than 9 bar and nominal deflection of greater than 30%, the aeroplane tire comprising:

a tread connected, by two sidewalls, to two beads said two beads being configured to come into contact with a rim comprising two rim flanges, each of said two rim flanges having a circular portion;

a radial carcass reinforcement comprising a plurality of carcass reinforcement layers, including a carcass reinforcement external layer, said carcass reinforcement external layer being the axially outermost of said plurality of carcass reinforcement layers, each of said plurality of carcass reinforcement layers comprising reinforcing elements which, within each of said two beads, are wrapped around a bead wire core, said bead wire core having a meridian section that is inscribed inside a circle the centre of which is the centre of said bead wire core;

a filling element radially on the outside of said bead wire core and having a substantially triangular meridian section exhibiting a radially external end; and a bead external face axially on the outside of said bead wire core and configured to come into contact with the corresponding rim flange;

wherein the distance between a point on said bead external face and said carcass reinforcement external layer, along the straight line perpendicular at this point to said bead external face, is at a maximum at the point on said bead external face that is the orthogonal projection of said radially external end of said filling element onto said bead external face, and wherein the distance between the orthogonal projection of said radially external end of said filling element onto said bead external face and said carcass reinforcement external layer is at least equal to 1.3 times the distance between the orthogonal projection of the centre of said bead wire core onto said bead external face and said carcass reinforcement external layer.

2. The tire according to claim 1, wherein the distance between the orthogonal projection of said radially external end of said filling element onto said bead external face and said carcass reinforcement external layer is at most equal to 3 times the distance between said orthogonal projection of the centre of said bead wire core onto said bead external face and said carcass reinforcement external layer.

3. The tire according to claim 1, wherein the distance between the orthogonal projection of the centre of said bead wire core onto said bead external face and said carcass reinforcement external layer is at least equal to 0.5 times the diameter of the circle circumscribing said bead wire core.

4. The tire according to claim 1, wherein the distance between the orthogonal projection of the centre of said bead wire core onto said bead external face and said carcass reinforcement external layer is at most equal to the diameter of the circle circumscribing said bead wire core.

5. The tire according to claim 1, wherein the distance between the point of said bead external face that is intended to be the last point of contact with the rim flange circular portion when a load equal to twice the nominal load is applied to the tire inflated to its nominal pressure, and said carcass reinforcement external layer is at least equal to 0.7 times the distance between the orthogonal projection of the centre of said bead wire core onto said bead external face and said carcass reinforcement external layer.

6. The tire according to claim 1, wherein the distance between the point of said bead external face that is intended to be the last point of contact with the rim flange circular portion when a load equal to twice the nominal load is applied to the tire inflated to its nominal pressure, and said carcass reinforcement external layer is at most equal to 1.5 times the distance between the orthogonal projection of the centre of said bead wire core onto said bead external face and said carcass reinforcement external layer.

7. The tire according to claim 1, wherein the radial distance of the orthogonal projection of said radially external end of said filling element onto said bead external face is at most equal to the radial distance of the point of said bead external face intended to be the last point of contact with the rim flange circular portion when the nominal load is applied to the tire inflated to its nominal pressure.

8. The tire according to claim 1, wherein the radial distance of the orthogonal projection of said radially external end of said filling element onto said bead external face is at least equal to 0.97 times the radial distance of the point of said bead external face intended to be the last point of contact with the rim flange circular portion when the nominal load is applied to the tire inflated to its nominal pressure.

9. The tire according to claim 1, wherein the reinforcing elements of said plurality of carcass reinforcement layers are made of textile materials.

10. The tire according to claim 9, wherein the reinforcing elements of said plurality of carcass reinforcement layers are made of one of aromatic polyamide, aliphatic polyamide, and hybrid type.

* * * * *